(12) United States Patent
Kitano et al.

(10) Patent No.: US 6,864,317 B1
(45) Date of Patent: Mar. 8, 2005

US006864317B1

(54) CURABLE COMPOSITIONS

(75) Inventors: Kenichi Kitano, Kobe (JP); Yoshiki Nakagawa, Kobe (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/787,106

(22) PCT Filed: Sep. 14, 1999

(86) PCT No.: PCT/JP99/05004

§ 371 (c)(1),
(2), (4) Date: Sep. 5, 2001

(87) PCT Pub. No.: WO00/15683

PCT Pub. Date: Mar. 23, 2000

(30) Foreign Application Priority Data

Sep. 14, 1998 (JP) ............................................. 10/260195

(51) Int. Cl.[7] .................................................. C08F 8/00
(52) U.S. Cl. ........................................ 525/132; 525/383
(58) Field of Search ................................... 525/132, 383

(56) References Cited

U.S. PATENT DOCUMENTS 3,966,837 A   6/1976  Riew et al. ............. 260/837 R
4,131,277 A * 12/1978  Randolph ................... 473/125

FOREIGN PATENT DOCUMENTS

GB         2 075 517 A     11/1981

OTHER PUBLICATIONS

Odian, Principles of Polymerization, Wiley–Interscience, $2^{nd}$ Ed., 1981, pp. 388–389.*
Abstract, Doc. No. XP–002178041, 1980, 1 p.
Abstract, Doc. No. XP–002178042, 1993, 1 p.

* cited by examiner

*Primary Examiner*—Kuo-Liang Peng
(74) *Attorney, Agent, or Firm*—Connolly, Bove, Lodge & Hutz, LLP

(57) ABSTRACT

The present invention provides a heat-curable composition gives cured phenolic resin products having excellent flexibility; the present invention relates to a heat-curable composition comprising (A) a vinyl polymer having at least one phenol group at the main-chain terminus and (B) a phenolic resin; the present invention related to a polymer obtainable by reacting (A) a vinyl polymer having at least one phenol group at the main-chain terminus with (C) an aldehyde compound, to a heat-curable composition comprising the polymer.

19 Claims, No Drawings

CURABLE COMPOSITIONS

TECHNICAL FIELD

The present invention relates to a phenolic resin-based heat-curable composition.

BACKGROUND ART

Phenolic resins have heretofore been used in a variety of fields such as various molding compounds, adhesives, coatings, plywood, and laminates but their drawback common to these uses is brittleness.

It is known that polymers having terminal functional groups, when used in combination with suitable curing agents, give cured products displaying good rubber-like elasticity. The main chains of such known polymers having terminal functional groups include polyether polymers such as polyethylene oxide; hydrocarbon polymers such as polyisobutylene, polybutadiene, polyisoprene and polychloroprene, inclusive of hydrogenation products thereof; and polyester polymers such as polyethylene terephthalate, polybutylene terephthalate, polycaprolactone, etc. and according td the backbone structure and mode of crosslinking, these polymers find application in a variety of uses of their own. However, most of them are polymers produced by ionic polymerization or polycondensation, and few vinyl polymers having functional groups at molecular termini, particularly vinyl polymers having phenol groups as a functional group, are available for commercial use.

In the above state of the art, the present invention has for its object to provide a phenolic-resin-based thermocurable composition giving cured products having flexibility.

SUMMARY OF THE INVENTION

The first aspect of the present invention relates to a heat-curable composition comprising
(A) a vinyl polymer having at least one phenol group at the main-chain terminus and
(B) a phenolic resin and
  to a shaped article as obtainable by curing the composition.

The second aspect of the present invention relates to a polymer obtainable by reacting (A) a vinyl polymer having at least one phenol group at the main-chain terminus with (C) an aldehyde compound,
  to a heat-curable composition comprising the polymer,
  and to a shaped article as obtainable by curing the composition.

The present invention is now described in detail.

DISCLOSURE OF THE INVENTION

The first aspect of the invention will be described below in the first place.
The (A) Component Vinyl Polymer Having a Phenol Group
  The phenol group in the context of the invention is any group of the general formula (1).

  (1)

(wherein Ar represents an unsubstituted or substituted aromatic ring).

The phenolic hydroxyl group of the above phenol group may be located in any of the ortho, meta and para positions with respect to the polymer chain but is preferably located in the para position.

In order that the vinyl polymers may crosslink each other to give a cured product, it is essential that the polymer have at least one phenol group per molecule, and the preferred number of phenol groups per molecule is 1.1 to 4 on the average.

Furthermore, for the expression of rubber-like elasticity, the phenol group must be located at the molecular chain terminus. However, it may be additionally present in the side chain as well.

The vinyl monomer constituting the main chain of said vinyl polymer having a phenol group is not particularly restricted but may be any of various monomers. As examples, there may be mentioned (meth)acrylic monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluyl (meth)acrylate, benzyl (meth)acrylate, 2-ethoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl) trimethoxysilane, (meth)acrylic acid-ethylene oxide adducts, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate and 2-perfluorohexadecylethyl (meth)acrylate; styrenic monomers such as styrene, vinyltoluene, α-methylstyrene, chlorostyrene, styrenesulfonic acid and salts thereof; fluorine-containing vinyl monomers such as perfluoroethylene, perfluoropropylene and vinylidene fluoride; silicon-containing vinyl monomers such as vinyltrimethoxysilane and vinyltriethoxysilane; maleic anhydride, maleic acid and monoalkyl esters and dialkyl esters of maleic acid; fumaric acid and monoalkyl esters and dialkyl esters of fumaric acid; maleimide monomers such as maleimide, methylmaleimide, ethylmaleimide, propylmaleimide, butylmaleimide, hexylmaleimide, octylmaleimide, dodecyimaleimide, stearylmaleimide, phenylmaleimide and cyclohexylmaleimide; nitrile-containing vinyl monomers such as acrylonitrile and methacrylonitrile; amido-containing vinyl monomers such as acrylamide and methacrylamide; vinyl esters such as vinyl acetate, vinyl propionate, vinyl pivalate, vinyl benzoate and vinyl cinnamate; alkenes such as ethylene and propylene; conjugated dienes such as butadiene and isoprene; vinyl chloride, vinylidene chloride, allyl chloride, allyl alcohol and so forth. These may be used singly or a plurality of them may be copolymerized. The expression "(meth)acrylic acid", for instance, as used herein above and below means "acrylic acid and/or methacrylic acid".

Within the above monomer, the main chain obtained by polymerizing a (meth)acrylic monomer or a styrenic monomer is preferred. The more preferred are (meth)acrylate monomers and the still more preferred are acrylate monomers. Moreover, from the standpoint of physical properties, (meth)acrylic polymers synthesized using not less than 40 weight % of a (meth)acrylic monomer is more preferred.

The molecular weight distribution of the vinyl polymer having at least one phenol group, that is to say the ratio (Mw/Mn) of weight average molecular weight (Mw) to number average molecular weight (Mn), is not particularly restricted. However, in order to hold the viscosity of the curable composition low enough to facilitate handling and yet impart satisfactory physical properties to the cured product, the molecular weight distribution is desirably as narrow as possible. The distribution value is preferably less than 1.8, more preferably not more than 1.7, still more preferably not more than 1.6, yet more preferably not more than 1.5, further more preferably not more than 1.4, and most preferably not more than 1.3. The molecular weight distribution can be determined by gel permeation chromatography (GPC) which is the most general determination method. Thus, using chloroform as the mobile phase and polystyrene gels as the column packing, the number average molecular weight can be measured in polystyrene equivalent.

The number average molecular weight of said vinyl polymer having at least one phenol group is not particularly restricted but is preferably within the range of 500 to 100000. When the molecular weight is less than 500, the intrinsic characteristics of vinyl polymers can hardly be expressed. On the other hand, when the molecular weight exceeds 100000, the polymer is not easy to handle.

The vinyl polymer having a phenol group can be synthesized by various polymerization techniques and said techniques is not particularly restricted. However, from the standpoint of monomer availability and ease of reaction control, the radical polymerization method is preferred.

The radical polymerization method can be divided into the "general radical polymerization method" in which a monomer having a given functional group is simply copolymerized with a vinyl monomer using an azo or peroxide compound as the polymerization initiator and the "controlled radical polymerization method" which is capable of introducing a given functional group into a defined position such as the molecular terminus.

The "general radical polymerization method" is an expedient method and can be used for purposes of the present invention. However, by this method, a monomer having a given functional group is introduced into the product polymer only in probabilities, and in order to synthesize a polymer of high functionality, this monomer must be used in a fairly large amount. When conversely the amount of the monomer is small, the ratio of polymer molecules not provided with the particular functional group is increased. Another disadvantage is that, since the reaction is a free radical polymerization reaction, the molecular weight distribution is more or less broadened so that only a polymer having a high viscosity can be obtained. On the other hand, the "controlled radical polymerization method" can be divided into the "chain transfer agent technique" in which a vinyl polymer having a functional group at a terminus is produced by carrying out the polymerization using a chain transfer agent having a given functional group, and the "living radical polymerization technique" in which the polymerization proceeds with the growing chain terminus not being interrupted by a termination reaction to give a polymer approximating the designed molecular weight.

The "chain transfer agent technique" is capable of giving a polymer of high functionality and can be used in the present invention but a chain transfer agent having a given functional group must be used in a fairly large amount relative to the initiator, with the consequent disadvantage in economics inclusive of the cost of treatment involved. A further disadvantage of the technique is that because it is also a free radical polymerization method as is said "general radical polymerization method", there can be obtained only a polymer having a broad molecular weight distribution and a high viscosity.

Unlike the above polymerization technology, the "living radical polymerization technique" is advantageous in that despite its also being a method for radical polymerization reaction which is generally considered to be hardly controllable because of the high velocity of polymerization and high incidence of a termination reaction by radical—radical coupling or the like, a termination reaction does not easily take place, thus giving a polymer with a narrow molecular weight distribution (Mw/Mn=about 1.1 to 1.5), and further in that the molecular weight can be freely controlled by adjusting the monomer-initiator charge ratio. Since it is thus capable of giving a polymer having a narrow molecular weight distribution profile and a low viscosity and enables introduction of a monomer having a given functional group in an almost planned position the "living radical polymerization" is a further preferred method for producing said vinyl polymer having a given functional group according to the present invention.

In a narrow sense of the term, "living polymerization" means a polymerization in which the molecule grows with its terminus being constantly activated. Generally, however, the term is used to broadly cover as well a pseudo-living polymerization reaction in which the polymer grows while molecules with an activated terminus and molecules with an inactivated terminus are in equilibrium, and the term as used in this specification also has the latter broad meaning.

Recently, "living radical polymerization" has been studied in earnest by many research groups. By way of illustration, this technology includes the method employing a cobalt porphyrin complex as described in J. Am. Chem. Soc., 116, 7943 (1994); the method using a radical scavenger such as a nitroxide compound as described in Macromolecules, 27, 7228 (1994), and the atom transfer radical polymerization (ATRP) method using an organohalogen compound as the initiator and a transition metal complex as the catalyst.

Among such versions of the "living radical polymerization method", the "atom transfer radical polymerization" method in which a vinyl monomer is polymerized using an organohalogen compound or a sulfonyl halide compound as the initiator and a transition metal complex as the catalyst is still more preferred for the production of said vinyl polymer having a given functional group because, in addition to the above-mentioned advantages of "living radical polymerization", it is capable of giving a polymer having a halogen or the like at its terminus, which is comparatively favorable for a functional group exchange reaction, and offers a broad freedom in the initiator and catalyst design. Regarding this atom transfer radical polymerization method, reference can be made to Matyjaszewski et al.: J. Am. Chem. Soc., 117, 5614 (1995), Macromolecules, 28, 7901 (1995), Science, 272, 866 (1996), WO 96/30421, WO 97/18247, and Sawamto et al. Macromolecules, 28, 1721 (1995), among others.

The initiator for use in the polymerization reaction is not particularly restricted but includes, for example, organohalogen compounds, particularly activated organohalogen compounds (e.g. ester compounds having a halogen in the α-position and compounds having a halogen in the benzyl moiety), and halogenated sulfonyl compounds. Using such a compound as the initiator, a halogen-terminated vinyl polymer can be obtained. By converting this terminal halogen in the manner described below, an alkenyl-terminated vinyl polymer can be obtained. Specific examples of said initiator include; $C_6H_5$—$CH_1X$, $C_6H_5$—C(H)(X)$CH_3$, $C_6H_5$—C(X)($CH_3$)$_2$ (wherein $C_6H_5$ represents a phenyl group; X represents chloro, bromo or iodo); $R^1$—C(H)(X)—$CO_2R^2$, $R_1$—C($CH_3$)(X)—$CO_2R^2$, $R^1$—C(H)(X)—C(O)$R^2$, $R^1$—C($CH_3$)(X)—C(O)$R^2$ (wherein $R^1$ and $R^2$ may be the same or different and each represents hydrogen, an alkyl group of 1 to 20 carbon atoms, an aryl group of 6 to 20 carbon atoms or an aralkyl group of 7 to 20 carbon atoms; X represents chloro, bromo or iodo); $R^1$—$C_6H_4$—$SO_2X$ (wherein $R^1$ represents hydrogen, an alkyl group of 1 to 20 carbon atoms, an aryl group of 6 to 20 carbon atoms or an aralkyl group of 7 to 20 carbon atoms; X represents chloro, bromo or iodo).

As the initiator, it is also possible to use an organohalogen compound or halogenated sulfonyl compound having a functional group other than the functional group taking charge of initiation of polymerization. In this case, there is obtained a polymer having said functional group of the initiator at one of the main chain termini and a halogen atom at the other terminus. As examples of said functional group, there can be mentioned alkenyl, crosslinkable silyl, hydroxyl, epoxy, amino, amido and carboxyl.

The organohalogen compound having an alkenyl group is not particularly restricted but includes compounds having the structure represented by the general formula (2), among others.

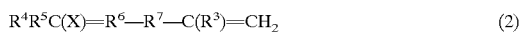
$R^4R^5C(X)$=$R^6$—$R^7$—$C(R^3)$=$CH_2$ (2)

(wherein $R^3$ represents hydrogen or a methyl group; $R^1$ and $R^5$ each represents hydrogen or a monovalent alkyl group of 1 to 20 carbon atoms, an aryl group of 6 to 20 carbon atoms or an aralkyl group of 7 to 20 carbon atoms, or $R^1$ and $R^5$ may be jointed to each other through their free ends; $R^6$ represents —C(O)O— (ester group), —C(O)— (keto group), or an o-, m- or p-phenylene group; RX represents a direct bond or a divalent organic group of 1 to 20 carbon atoms which may optionally contain one or more ether linkages; X represents chloro, bromo or iodo).

Specifically, $R^1$ and $R^5$ each includes hydrogen, methyl, ethyl, n-propyl, isopropyl, butyl, pentyl and hexyl, among others. $R^1$ and $R^5$ may be jointed to each other through their free ends to form a cyclic structure.

As the organohalogen compound having an alkenyl group, compounds of the following general formula (3) can be further mentioned.

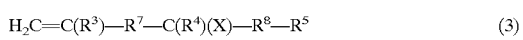
$H_2C$=$C(R^3)$—$R^7$—$C(R^4)(X)$—$R^8$—$R^5$ (3)

(wherein $R^3$, $R^4$, $R^5$ and $R^7$ are as defined above; $R^8$ represents a direct bond, —C(O)O— (ester group), —C(O)— (keto group), or an o-, m- or p-phenylene group; X is as defined above).

$R^7$ represents either a direct bond or a divalent organic group of 1 to 20 carbon atoms (optionally containing 1 or more ether linkages). However, when $R^7$ is a direct bond, the vinyl group is attached to the carbon to which the halogen is attached, thus forming an allyl halide. Since, in this case, the carbon-halogen bond has been activated by the adjacent vinyl group, $R^8$ need not necessarily be a C(O)O group or a phenylene group but may be a direct bond. When $R^7$ is not a direct bond, $R^8$ is preferably a C(O)O group, a C(O) group or a phenylene group in order that the carbon-halogen bond may be activated.

Specific examples of the halogenated sulfonyl compound having an alkenyl group include, for example;
o-, m- or p-$CH_2$=CH—$(CH_2)_n$—$C_6H_4$—$SO_2X$,
o-, m- or p-$CH_2$=CH—$(CH_2)_n$—O—$C_6H_4$—$SO_2X$,
(in each formula, X represents chloro, bromo or iodo; n represents an integer of 0 to 20).

The organohalogen compound having a crosslinkable silyl group is not particularly restricted but includes compounds having the structure represented by the following general formula (4), among others.

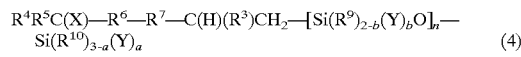
$R^4R^5C(X)$—$R^6$—$R^7$—$C(H)(R^3)CH_2$—$[Si(R^9)_{2-b}(Y)_bO]_n$—$Si(R^{10})_{3-a}(Y)_a$ (4)

(wherein $R^3$, $R^4$, $R^5$, $R^6$, $R^7$ and X are as defined above; $R^9$ and $R^{10}$ each represents an alkyl group of 1 to 20 carbon atoms, an aryl group of 6 to 20 carbon atoms, an aralkyl group of 7 to 20 carbon atoms, or a triorganosiloxy group of the formula $R'_3SiO$— ($R'$ represents a monovalent hydrocarbon group of 1 to 20 carbon atoms and the 3 $R'$ groups may be the same or different); when 2 or more $R^9$ or $R^{10}$ groups are present, they may be the same or different; Y represents a hydroxyl group or a hydrolyzable group and when two or more Y groups exist, they may be the same or different; a is equal to 0, 1, 2 or 3; b is equal to 0, 1 or 2; m represents an integer of 0 to 19; provided, however, that the condition of a+mb≧1 is satisfied).

The organohalogen compound having a crosslinkable silyl group further includes compounds having the structure represented by the general formula (5).

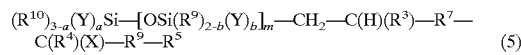
$(R^{10})_{3-a}(Y)_aSi$—$[OSi(R^9)_{2-b}(Y)_b]_m$—$CH_2$—$C(H)(R^3)$—$R^7$—$C(R^4)(X)$—$R^9$—$R^5$ (5)

(wherein $R^3$, $R^4$, $R^5$, $R^7$, $R^8$, $R^9$, $R^{10}$, a, b, m, X and Y are as defined above).

The organohalogen compound or halogenated sulfonyl compound having a hydroxyl group is not particularly restricted but includes compounds of the following formula:

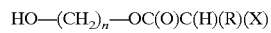
HO—$(CH_2)_n$—OC(O)C(H)(R)(X)

(wherein X represents chloro, bromo or iodo; R represents hydrogen, an alkyl group of 1 to 20 carbon atoms, an aryl group of 6 to 20 carbon atoms or an aralkyl group of 7 to 20 carbon atoms; n represents an integer of 1 to 20).

The organohalogen compound or halogenated sulfonyl compound having an amino group is not particularly restricted but includes compounds of the following formula.

$H_2N$—$(CH_2)_a$—OC(O)C(H)(R) (X)

(wherein X represents chloro, bromo or iodo; R represents hydrogen, an alkyl group of 1 to 20 carbon atoms, an aryl group of 6 to 20 carbon atoms or an aralkyl group of 7 to 20 carbon atoms; n represents an integer of 1 to 20).

The organohalogen compound or halogenated sulfonyl compound having an epoxy group is not particularly restricted but includes compounds of the following formula:

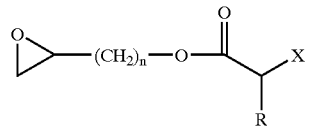

(wherein X represents chloro, bromo or iodo; R represents hydrogen, an alkyl group of 1 to 20 carbon atoms, an aryl group of 6 to 20 carbon atoms or an aralkyl group of 7 to 20 carbon atoms; n represents an integer of 1 to 20).

Furthermore, the polymerization reaction may be carried out using an organohalogen compound or sulfonyl halide compound having 2 or more initiation points as the initiator. In such a case, a vinyl polymer having 2 or more halogen atoms per molecule can be obtained.

The initiator having 2 or more initiation sites include but is not restricted to the following compounds.

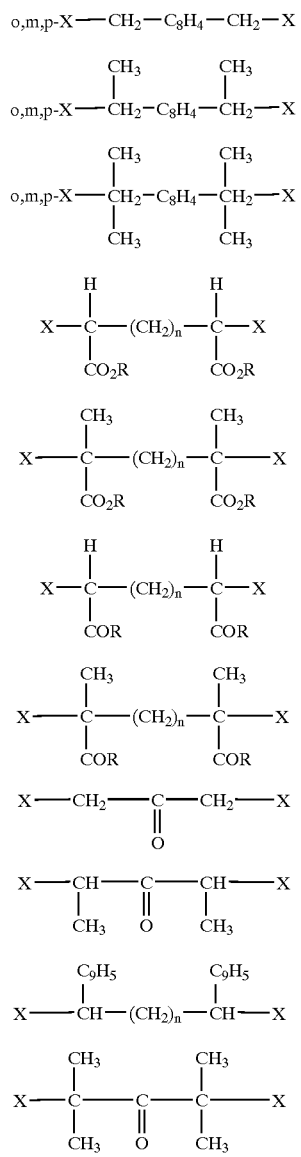

(Referring to the above formulas, $C_6H_4$ represents a phenylene group; X represents chloro, bromo or iodo; R represents an alkyl group of 1 to 20 carbon atoms, an aryl group of 6 to 20 carbon atoms or an aralkyl group of 7 to 20 carbon atoms; n represents an integer of 0 to 20);

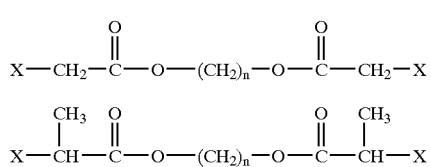

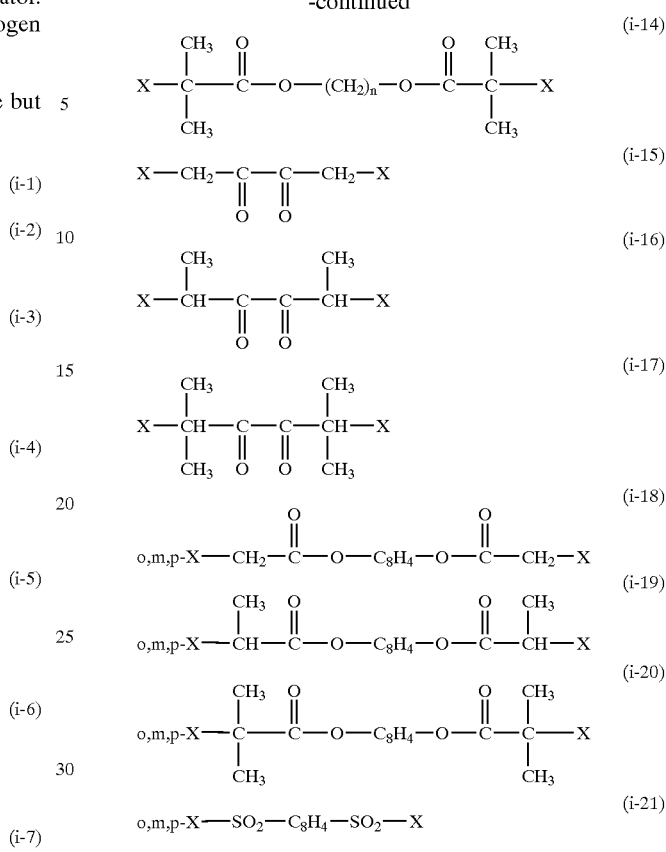

(In the above formulas, X represents chloro, bromo or iodo; a represents an integer of 0 to 20; $C_6H_4$ represents a phenylene group).

The transition metal complex which can be used as the catalyst for said atom transfer radical polymerization includes complexes of center metals belonging to Groups 7, 8, 9, 10 and 11 of the Periodic Table of the Elements. As preferred examples, complex compounds of zero-valent copper ($Cu^0$), monovalent copper, divalent ruthenium, divalent iron or divalent nickel can be mentioned. The preferred, among these, are complexes of copper. As specific compounds of monovalent copper, there can be mentioned cuprous chloride, cuprous bromide, cuprous iodide, cuprous cyanide, cuprous oxide, cuprous perchlorate, and so on. When a copper complex is used, its catalytic activity can be increased by adding, as the ligand, 2,2-bipyridyl or its derivative, 1,10-phenanthroline or its derivative and a polyamine such as tetramethylethylenediamine, pentamethyldiethylenetriamine, hexamethyltris(2-aminoethyl)amine or the like. The tris(triphenylphosphine) complex of divalent ruthenium chloride ($RuCl_2(PPh_3)_3$) is also suited as the catalyst. When a ruthenium complex is used as the catalyst, an aluminum alkoxide may be added as the activator. Also suited as the catalyst are the bis (triphenylphosphine) complex of divalent iron ($FeCl_2(PPh_3)_2$), bis(triphenylphosphine) complex of divalent nickel ($NiCl_2(PPh_3)_2$), and bis(tributylphosphine) complex of divalent nickel ($NiBr_2(PBu_3)_2$).

The vinyl monomer for use in this polymerization is not particularly restricted but all the monomers mentioned hereinbefore can be used with advantage.

The above polymerization reaction can be conducted in the absence of a solvent or in the presence of a solvent selected from a broad range. The solvent which can be used thus includes hydrocarbon solvents such as benzene, toluene, etc.; ether solvents such as diethyl ether, tetrahydrofuran, diphenyl ether, anisole, dimethoxybenzene, etc.; halogenated hydrocarbon solvents such as methylene chloride, chloroform, chlorobenzene, etc.; ketone solvents such as acetone, methyl ethyl ketone, methyl isobutyl ketone, etc.; alcohol solvents such as methanol, ethanol, propanol, isopropyl-alcohol, n-butyl alcohol, tert-butyl alcohol, etc.; nitrile solvents such as acetonitrile, propionitrile, benzonitrile, etc.; ester solvents such as ethyl acetate, butyl acetate, etc.; and carbonate solvents such as ethylene carbonate, propylene carbonate, etc.; among others. These can be used independently or two or more of them can be used as a blend. Moreover, the polymerization reaction can be carried out in an emulsion system or a system using supercritical fluid $CO_2$ as the medium.

The polymerization can be carried out within the temperature range of 0 to 200° C., preferably at room temperature to 150° C.

The vinyl polymer having at least one phenol group can be prepared by the following procedures, however these products are not restricted thereto.

(A) The method comprising introducing a phenol group directly into the vinyl polymer at synthesis of the polymer by radical polymerization.

(B) The method starting with a vinyl polymer having at least one halogen wherein a phenol group-containing functional group is substituted for the halogen.

The first method of synthesis (A) comprising introducing a phenol group directly into the polymer is not particularly restricted but includes the following specific procedures (A-a) and (A-b), among others.

(A-a) In synthesizing a vinyl polymer by living radical polymerization, not only a predetermined vinyl monomer but also a compound having both a polymerizable alkenyl group and a phenol group per molecule, such as a compound of the following general formula (6), is reacted.

$$CH_2=C(R^{11})-C_6H_4-OH \qquad (6)$$

(wherein $R^{11}$ represents hydrogen or an organic group containing 1 to 10 carbon atoms).

The species of the compound of the general formula (6) is not particularly restricted but is preferably vinylphenol.

In case the phenol group may interfere with the reaction, the phenol group may have been protected with a suitable protective group. As such compounds, alkoxystyrene monomers such as p-t-butoxystyrene can be mentioned.

The timing of reacting said compound having both a polymerizable alkenyl group and a phenol group is not particularly restricted but in the living radical polymerization, this compound is preferably reacted as a secondary monomer in the terminal stage of the polymerization reaction or after completion of reaction of the given monomer.

(A-b) In synthesizing a vinyl polymer by living radical polymerization, said compound having both a less-polymerizable alkenyl group and a phenol group is reacted as a secondary monomer in the terminal stage of the polymerization reaction or after completion of reaction of the given monomer.

Such compound is not particularly restricted but includes allylphenol and allyloxyphenol, among others. In case the phenol group may interfere with the reaction, it may be protected with a suitable protective group in advance.

In the method of synthesis (A) wherein a vinyl polymer having at least one phenol group is produced by direct introduction of the phenol group, the procedure (A-b) is preferred in view of the ease with which the number of units of the phenol group to be introduced per molecule can be easily controlled.

The preferred method for synthesizing a vinyl polymer having at least one halogen for use in the above method of synthesis (B) is the atom transfer radical polymerization technique. The method of substituting a phenol group-containing functional group for the halogen of this polymer is not particularly restricted but includes, for example, the substitution method for halogen comprising reacting a vinyl polymer having at least one highly reactive carbon-halogen bond with an oxyanion such as the one represented by the following formula (7) or (8).

$$HO-C_6H_4-R^{12}-O^-M^+ \qquad (7)$$

$$HO-C_6H_4-R^{12}-C(O)O^-M^+ \qquad (8)$$

(wherein $R^{12}$ represents a $C_{1-20}$ divalent organic group optionally containing a direct bond or an ether linkage; $M^+$ represents an alkali metal ion or a quaternary ammonium ion).

As the oxyanion to be used, a phenol group-containing carboxylate anion is more preferred.

The oxyanion of the above general formula (71 or (8) can be obtained by causing a basic compound to act on the corresponding precursor and abstracting the active proton.

The precursor compound mentioned above includes catechol, resorcinol, hydroquinone and hydroxybenzoic acid.

Specific examples of the alkali metal ion include the lithium ion, sodium ion and potassium ion and, as the quaternary ammonium ion, there may be mentioned the tetramethylammonium ion, tetraethylammonium ion, trimethylbenzylammonium ion, trimethyldodecylammonium ion and tetrabutylammonium ion.

As such basic compounds, there may be mentioned the following:

Alkali metals such as sodium, potassium and lithium; metal alkoxides such as sodium methoxide, potassium methoxide, lithium methoxide, sodium ethoxide, potassium ethoxide, lithium ethoxide, sodium tert-butoxide and potassium tert-butoxide; carbonates such as sodium carbonate, potassium carbonate, lithium carbonate and sodium hydrogen carbonate; hydroxides such as sodium hydroxide and potassium hydroxide; hydrides such as sodium hydride, potassium hydride, methyllithium and ethyllithium; organometals such as n-butyllithium, tert-butyllithium, lithium diisopropylamide and lithium hexamethyldisilazide; ammonia; alkylamines such as trimethylamine, triethylamine and tributylamine; polyamines such as tetramethylethylenediamine and pentamethyldiethylenetriamine; pyridine compounds such as pyridine and picoline, etc.

The basic compound is used in an equivalent amount or in a slight excess relative to the precursor substance, preferably in an amount or 1 to 1.2 equivalents.

A quaternary ammonium salt may also be used as the above oxyanion. In this ca se, it can be obtained by preparing an alkali metal salt of a carboxylic acid compound and reacting this with a quaternary ammonium halide. As examples of the quaternary ammonium halide, there may be mentioned tetramethylammonium halides, tetraethylammonium halides, trimethylbenzylammonium halides, trimethyldodecylammonium halides and tetrabutylammonium halides.

As the solvent to be used in reacting the above precursor with a basic compound, there may be mentioned hydrocarbon solvents such as benzene and toluene; ether solvents such as diethyl ether, tetrahydrofuran, diphenyl ether, anisole and dimethoxybenzene; halogenated hydrocarbon solvents such as methylene chloride and chloroform; ketone solvents such as acetone, methyl ethyl ketone and methyl isobutyl ketone; alcohol solvents such as methanol, ethanol, propanol, isopropanol, n-butyl alcohol and tert-butyl alcohol; nitrile solvents such as acetonitrile, propionitrile and benzonitrile; ester solvents such as ethyl acetate and butyl acetate; carbonate solvents such as ethylene carbonate and propylene carbonate; amide solvents such as dimethylformamide and dimethylacetamide; sulfoxide solvents such as dimethyl sulfoxide; and so on. These may be used singly or two or more of them may be used in admixture.

The method of synthesizing said vinyl polymer having at least one highly reactive carbon-halogen bond is not particularly restricted but includes, among others, the method using a halide, e.g. carbon tetrachloride, ethylene chloride, carbon tetrabromide or methylene bromide, as the chain transfer agent in radical polymerization as described in Japanese Kokai Publication Hei-4-132706 (chain transfer agent technique) and the method for radical polymerization of a vinyl monomer using an organic halide having at least one highly reactive carbon-halogen bond or a sulfonyl halide as the initiator and a transition metal complex as the catalyst (atom transfer radical polymerization technique). The polymers obtainable by the above two methods invariably have a terminal carbon-halogen bond and, therefore, both methods are useful for the production of phenol group-terminated vinyl polymers. However, particularly in view of the ease of control over molecular weight and molecular weight distribution, the latter technique, i.e. atom transfer radical polymerization technique, is preferred.

The (B) Component Phenolic Resin

The (B) component phenolic resin may be a known resin. Thus, the resol-type or novolac-type phenol resins which are obtainable by the condensation reaction of a phenolic compound, such as phenol, cresol, xylenol, resorcinol, an alkylphenol and a modified phenol (e.g. cashew oil-modified phenol, tall oil-modified phenol, etc.) with an aldehyde compound such as formalin, paraformaldehyde and the like, and nitrogen-containing phenolic resins obtainable by said reaction of the phenolic compounds with said aldehyde where an ammonia- or amine-based compound is used as a catalyst. These may be used each independently or optionally a mixture of two or more of them can be employed.

The mixing ratio of phenol-terminated vinyl polymer (A) and phenolic resin (B) is not particularly restricted but can be adjusted according to the intended use of the cured product. Generally speaking, the ratio of (A) component to (B) component is not particularly restricted but is 0.01 to 0.99, preferably 0.05 to 0.95. For example, when it is intended to improve the impact resistance, flexibility, toughness and peel strength of cured phenolic resins, the phenol-terminated vinyl polymer (A) can be added in a small proportion to phenolic resin (B). For improving the strength of the cured resin, the amount of phenolic resin (B) may be increased. While the heat-curable composition of the invention gives a cured product having excellent rubber-like elasticity, it may give a broad range of products from a rubbery cured product to a resinous cured product depending on the ratio of both components.

When a novolac resin is used as phenolic resin (B), an aldehyde or the like compound is preferably used as the curing agent. As the aldehyde compound, the compounds mentioned later herein can be employed.

Where necessary, the heat-curable composition of the invention may be supplemented with various fillers, plasticizers, antioxidants, UV absorbers, lubricants, pigments, forming agents, and so forth.

When a filler is used as an additive, such a filler as generally used in phenolic resins, namely woodmeal, pulp, cotton chips, asbestos, glass fiber, mica, walnut shell flour, rice hull flour, graphite, diatomaceous earth, clay, etc., can be employed with advantage. Such other fillers as fumed silica, precipitated silica, silicic anhydride, carbon black, calcium carbonate, clay, talc, titanium oxide and magnesium carbonate may also be used. These fillers may be used singly or two or more of them may be used in admixture.

The properties of the cured product depend on the main chain structure and molecular weight of the (A) component phenol group-terminated vinyl polymer as well and may range broadly from those of a rubber product to those of a resin product.

The method of molding the heat-curable composition is not particularly restricted but when the cured product is to be rubber-like, the method in routine use for the molding of rubber-type liquid polymers is preferably employed. Molding by such a method may give an adhesive, sealant, rubbery shaped article or rubber-like foam with improved strength. On the other hand, when the cured product is to be resinous, it is preferable to employ a molding method in routine use for the molding of phenolic resins, such as compression molding, transfer molding or injection molding. The shaped articles produced by any of these molding methods also belong to the first aspect of the present invention.

As typical uses for the heat-curable composition according to the invention, there can be mentioned various sealants, adhesives, self-adhesives, elastic adhesives, coatings, powder coatings, foams, electric/electronic potting agents, films, gaskets, plywood, laminates, molding compounds, artificial marble, copper-clad laminates, reinforced wood, phenol resin foam, binders for fiber-boards or particle boards, shell mold binders, brake lining binders, glass fiber binders, and so on.

The second aspect of the present invention is now described.

The polymer according to the second aspect of the invention is a vinyl polymer having a resol-type or novolac-type phenol resin structure at its terminus as formed by the condensation reaction of (A) a vinyl polymer having at least one phenol group at the main-chain terminus with (C) an aldehyde compound. This phenol-terminated vinyl polymer (A) is the same as the one described hereinbefore.

The aldehyde compound (C) for use in this invention is not particularly restricted but any of the aldehyde compounds that have heretofore been used as starting materials for phenolic resins in general can be used with advantage.

The aldehyde compound in the context of this invention means a class of compounds which are recognized by those concerned with phenolic resins to be aldehyde compounds.

The aldehyde compound includes but is not limited to formaldehyde, hexamethylenetetramine, paraformaldehyde, furfural, acetaldehyde, salicylaldehyde and other aldehydes mentioned under the heading of "ALDEHYDES" on page 30 of Plastic Gijutsu Zensho (Encyclopedia of Plastic Technology) 15, Phenol Resin (authored by Uenaka, Kogyo Chosakai). These can be used each independently or optionally in a combination of two or more different species. As the aldehyde compounds, formaldehyde and hexamethylenetetramine are preferred. Formaldehyde is generally used in the form of formalin. While hexamethylenetetramine is in routine use as a curing agent for novolac-type phenolic resins in particular, it functions as a crosslinking agent in a curing reaction system according to a reaction mechanism similar to that of formaldehyde.

The ratio of aldehyde compound (C) to phenol group-terminated vinyl polymer (A) is not particularly restricted but can be judiciously selected according to the performance characteristics required of the polymer. Generally, however, the number of aldehyde groups which should be available per phenol group of polymer (A) is preferably 0.3 to 10, more preferably 0.6 to 5.0.

While the polymer according to the second aspect of the present invention is formed on the condensation reaction between components (A) and (C), this reaction may be conducted adding a catalyst and a solvent where necessary.

As the catalyst, any of the catalysts in use for the production of known phenolic resins can be used with advantage. The catalyst which can be used generally includes inorganic or organic acids and bases, such as hydrochloric acid, oxalic acid, formic acid, acetic acid, orthophosphoric acid, butyric acid, lactic acid, boric acid, p-toluenesulfonic acid, benzenesulfonic acid, sodium hydroxide, potassium hydroxide, hexamethylenetetramine, aqueous ammonia, trimethylamine, triethylamine, pyridine and calcium hydroxide, among others. When ammonia or an amine compound is used as the catalyst, a nitrogen-containing phenolic resin is obtained.

The solvent is not particularly restricted but may be the common solvent, although alcohols such as methanol are preferred. Depending on the intended application, xylene, toluene, methyl ethyl ketone or the like can also be employed. These solvents can be used each independently or optionally in a combination of two or more different species.

Furthermore, the above condensation reaction may be carried out adding the phenolic compound (the (D) component). The (D) component is not particularly restricted but any of the phenolic compounds in use for the production of known phenolic resins can be used with advantage. Specific examples thereof include phenol, cresol, xylenol, resorcinol, alkylphenols and modified phenols (e.g. cashew oil-modified phenol, tall oil-modified phenol, etc.). By adjusting the formulating ratio of (A) and (D) components, a broad range of novel phenolic resins can be liberally prepared.

The conditions of condensation reaction for producing the polymer according to the second aspect of the invention may be those in routine use for the production of known phenolic resins but when the polymer (A) to be used contains two or more phenol groups per molecule, the reaction temperature and time must be judiciously controlled, for otherwise the system tends to undergo gelation with the progress of condensation.

The polymer according to the second aspect of the invention may be processed into a heat-curable composition comprising the polymer. Such heat-curable composition also belongs to the second aspect of the invention. This heat-curable composition may be supplemented with said filler, plasticizer, antioxidant, ultraviolet absorber, lubricant, pigment, forming agent, etc. where necessary.

When the polymer according to the second aspect of the invention is a novolac-type polymer, it is preferred to use a curing agent such as an aldehyde compound for curing. The aldehyde compound which can be used includes the compounds mentioned hereinbefore.

The properties of the cured product depend on the main chain structure and molecular weight of the phenol group-terminated vinyl polymer (A) as well and a broad range of products from rubbery ones to resinous ones can be produced as desired.

The method of molding the heat-curable composition according to the second aspect of the invention is not particularly restricted. However, when the cured product is to have rubber-like properties, the molding is preferably carried out by a technique in routine use for the molding of rubbery liquid polymers. By such a molding technique, adhesives, sealants, rubber-like shaped articles, rubber-like foams, etc. with improved strength can be obtained. On the other hand, when the cured product is to have resinous properties, the molding is preferably carried out by a technique in routine use for the molding of phenolic resins, such as compression molding, transfer molding and injection molding. The shaped articles thus produced also belong to the second aspect of the present invention.

Specific exemplary applications of the beat-curable composition according to the second aspect of the invention include sealants, adhesives, self-adhesives, elastic adhesives, coatings, powder coatings, foams, electric/electronic potting agents, films, gaskets, plywood, laminates, molding compounds, artificial marble, copper-clad laminates, reinforced wood, phenolic resin foam, binders for fiber-boards or particle boards, shell mold binders, brake lining binders, glass fiber binders, and so on.

BEST MODE FOR CARRYING OUT THE INVENTION

The following examples and comparative examples illustrate the present invention in further detail, it being, however, to be understood that these examples are by no means limitative of the scope of the invention.

As referred to in the following examples, the "number average molecular weight" and "molecular weight distribution (ratio of weight average molecular weight to number average molecular weight)" are the values determined by gel permeation chromatography (GPC) based on polystyrene standards. Thus, a column packed with crosslinked polystyrene gels was used as the GPC column and chloroform was used as the GPC solvent.

PRODUCTION EXAMPLE 1

Examples of Synthesis of a Br Group-Terminated poly(butyl acrylate)

A 10-L separable flask equipped with a reflux-condenser and a stirrer was charged with CuBr (28.0g, 0.20 mol), followed by nitrogen gas purging. Then, acetonitrile (559 mL) was added and the mixture was stirred on an oil bath at 70° C. for 40 minutes. Thereafter, butyl acrylate (1.00 kg), diethyl 2,5-dibromoadipate (117 g, 0.325 mol) and pentamethyldiethylenetriamine [hereinafter sometimes referred to briefly as triamine] (1.7 mL, 1.41 g, 8.1 mmol) were added and the reaction as started. Under heating at 70° C. with constant stirring, butyl acrylate (4.00 kg) was continuously added dropwise. In the course of dripping butyl acrylate, triamine (8.5 mL, 7.06 g, 0.041 mol) was further added.

This reaction mixture was diluted with toluene and passed through an activated alumina column, and the volatile matter was distilled off under reduced pressure, whereby a Br group-terminated polymer (polymer [1]) was obtained. This polymer [1] had a number average molecular weight of 19500 and a molecular weight distribution value of 1.17.

PRODUCTION EXAMPLE 2

Example of Synthesis of a Phenol Group-Terminated poly(butyl acrylate)-1

A 100-mL reactor was charged with the polymer (1) obtained in Production Example 1 (50 g), potassium p-hydroxybenzoate (1.96 g, 11.1 mmol) and dimethylacetamide (50 mL). Under nitrogen, the mixture was stirred at 70' for 3 hours. The resulting reaction mixture was diluted with toluene and passed through an activated alumina column and the volatile matter was distilled off under reduced pressure. The resulting polymer was dissolved in toluene and passed through an activated alumina column again. The toluene was then distilled off under reduced pressure, whereupon a phenol group-terminated poly(butyl acrylate) (polymer [2]) was obtained. The average number of phenol groups introduced per mole of the polymer was 2.3 as determined by $^1$H NMR analysis.

PRODUCTION EXAMPLE 3

Example of Synthesis of a Phenol Group-Terminated poly (butyl acrylate)-5

In 10 mL of dimethylacetamide was dissolved resorcinol (0.56 g, 5.13 mmol) followed by addition of t-butoxypotassium (0.12 g, 1.03 mmol)/t-butanol and stirring. Then, the polymer [1] (10 g) obtained in Production Example 1 was added and the mixture was stirred under heating at 70° C. for 2 hours. This reaction mixture was diluted with toluene and passed through an activated alumina column, and the solvent was distilled off under reduced pressure. The resulting polymer was dissolved in toluene and passed through an activated alumina column again and the toluene was distilled off under reduced pressure, whereupon a phenol group-terminated poly(butyl acrylate) (polymer [3]) was obtained. The introduction of the phenol group into the polymer was verified by $^1$H NMR spectrometry.

PRODUCTION EXAMPLE 4

Synthesis of a Novolac Phenolic Resin

A 500-mL three-necked flask equipped with a reflux-condenser was charged with phenol (76 g, 0.81 mol), water (10 g), 37% aqueous solution of formaldehyde (54 g) and oxalic acid dehydrate (0.70 g) and the mixture was refluxed for 30 minutes. Then, a supplemental amount (0.70 g) of oxalic acid dihydrate was added and the mixture was further refluxed for another hour. Then, the reaction system was cooled by adding 200 mL of water. While the resin phase was precipitated, the aqueous phase was removed by decantation. The resin phase was heated under reduced pressure to recover a phenolic resin. This resin was cooled to room temperature and comminuted.

COMPARATIVE EXAMPLE 1

The phenolic resin obtained in Production Example 4 (100 parts) was mixed well with hexamethylenetetramine (4 parts) and the mixture was heated to cure at 150° C. for 15 minutes. The cured product was hard and brittle.

EXAMPLE 1

The phenolic resin obtained in Production Example 4 (100 parts), the polymer [3] obtained in Production Example 3 (15 parts), and hexamethylenetetramine (4 parts) were mixed well and heated at 150° C. for 15 minutes to give a cured product. In contrast to the product obtained in Comparative Example 1, this cured product was flexible.

EXAMPLE 2

The phenolic resin obtained in Production Example 4 (100 parts), the polymer [3] obtained in Production Example 3 (100 parts), and hexamethylenetetramine (8 parts) were mixed well and heated at 150° C. for 3 hours to give a cured product. This cured product had rubber-like elasticity.

INDUSTRIAL APPLICABILITY

The heat-curable composition comprising a vinyl polymer having a phenol group at the main chain terminus at a high rate and a phenolic resin in accordance with the present invention gives cured phenolic resin products having excellent characteristics such as rubber-like elasticity. The invention thus corrects for the brittleness of cured products which is the drawback of the hitherto-known phenolic resins.

What is claimed is:

1. A heat-curable composition comprising
   (A) a vinyl polymer having at least one phenol group at the main chain terminus, wherein the (A) component vinyl polymer has its main chain produced by polymerizing a (meth)acrylic monomer and wherein the (a) component vinyl polymer has a ratio (Mw/Mn) of weight average molecular weight (Mw) and number average molecular weight (Mn) as measured by gel permeation chromatography of less than 1.8
   and (B) a phenolic resin.

2. The heat-curable composition according to claim 1 wherein the (A) component vinyl polymer has its main chain produced by the living radical polymerization of a meth (acrylic) monomer.

3. The heat-curable composition according to claim 1 wherein the (A) component vinyl polymer has its main chain produced by the atom transfer radical polymerization of a (meth)acrylic monomer.

4. The heat-curable composition according to claim 1 wherein the (A) component vinyl polymer is obtained by the procedure comprising
   (1) producing a halogen-terminated vinyl polymer by atom transfer radical polymerization and
   (2) converting the terminal halogen of said polymer to a phenol group-containing subsistent group.

5. The heat-curable composition according to claim 1 wherein the (meth)acrylic monomer is a (meth)acrylic acid ester monomer.

6. The heat-curable composition according to claim 5 wherein the (meth) acrylic acid ester monomer is an acrylic acid ester monomer.

7. The heat curable composition according to claim 1 wherein the (A) component vinyl polymer has a number average molecular weight of 500 to 100,000.

8. A shaped article as obtained by curing the heat-curable composition according to claim 1.

9. The heat-curable-composition according to claim 1 further comprising (C) and aldehyde compound.

10. A polymer as obtained by reacting
    (A) a vinyl polymer having at least one phenol group at the main chain terminus, wherein the (A) component vinyl polymer has its main chain produced by polymerizing a (meth)acrylic monomer and wherein the (A) component vinyl polymer has a ratio (Mw/Mn) of weight average molecular weight (Mw) and number average molecular weight (Mn) as measured by gel permeation chromatography of less than 1.8 with (C) an aldehyde compound.

11. The polymer according to claim 10 wherein the (A) component vinyl polymer has its main chain produced by the living radical polymerization of a (meth)acrylic monomer.

12. The polymer according to claim 10 wherein the (A) component vinyl polymer has its main chain produced by the atom transfer radical polymerization of a (meth)acrylic monomer.

13. The polymer according to claim 10 wherein the (A) component vinyl polymer is obtained by the procedure comprising
    (1) producing a halogen-terminated vinyl polymer by atom transfer radical polymerization and
    (2) converting the terminal halogen of said polymer to a phenol group-containing substituent group.

14. The polymer according to claim 10 wherein the (meth) acrylic monomer is a (meth)acrylic acid ester monomer.

15. The polymer according to claim 14 wherein the (meth)acrylic acid ester monomer is an acrylic acid ester monomer.

16. The polymer according to claim 10 wherein the (A) component vinyl polymer has a number average molecular weight of 500 to 100,000.

17. The polymer according to claim 10 wherein the aldehyde compound C is at least one member selected from the group consisting of formaldehyde, hexamethylenetetramine, paraformaldehyde, furfural, acetaldehyde and salicyladehyde.

18. A heat curable composition comprising the polymer according to claim 10.

19. A shaped article as obtainable by curing the heat-curable composition according to claim 18.

* * * * *